Jan. 9, 1951   H. M. STUELAND   2,537,557
CLUTCH AND BRAKE MECHANISM
Filed Feb. 21, 1946   3 Sheets-Sheet 1

INVENTOR.
HAROLD M. STUELAND
BY
ATTORNEYS.

Jan. 9, 1951     H. M. STUELAND     2,537,557
CLUTCH AND BRAKE MECHANISM
Filed Feb. 21, 1946     3 Sheets-Sheet 2
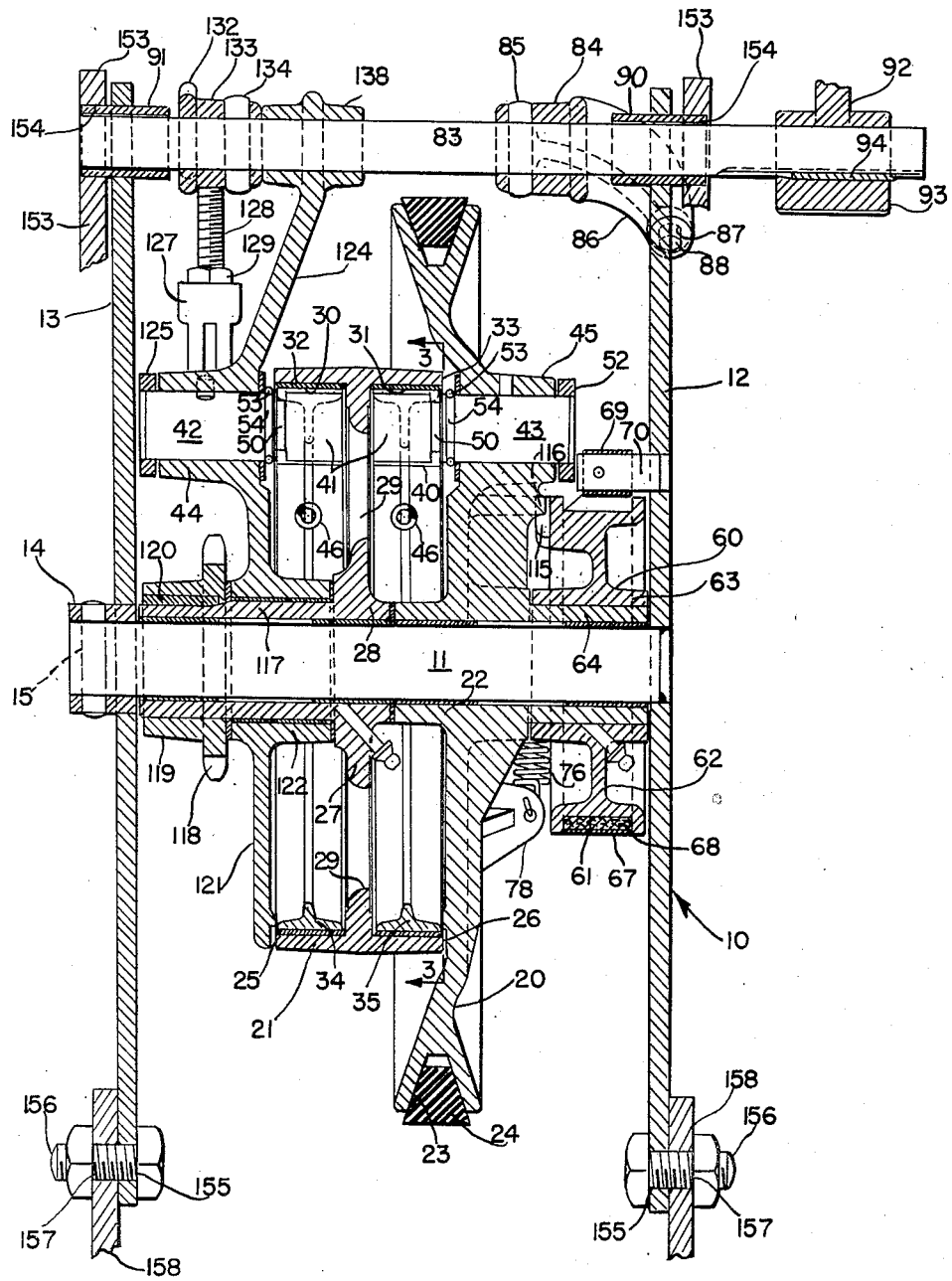
FIG. 2
INVENTOR.
HAROLD M. STUELAND
ATTORNEYS.

Jan. 9, 1951 H. M. STUELAND 2,537,557
CLUTCH AND BRAKE MECHANISM
Filed Feb. 21, 1946 3 Sheets-Sheet 3

INVENTOR.
HAROLD M. STUELAND
BY
ATTORNEYS.

UNITED STATES PATENT OFFICE 2,537,557

CLUTCH AND BRAKE MECHANISM

Harold M. Stueland, East Moline, Ill., assignor to Deere & Company, Moline, Ill., a corporation of Illinois Application February 21, 1946, Serial No. 649,332

8 Claims. (Cl. 192—12)

The present invention relates generally to power transmitting mechanism and more particularly to clutch and brake mechanism, and is specifically related to clutch and brake mechanism of the type used for mechanical hoisting apparatus, and has for its principal object the provision of a novel and improved clutch and brake assembly, in which the clutch and brake elements are disposed within opposite ends of a rotatable drum, each of the clutch and brake elements comprising an expansible shoe disposed within an internal cylindrical frictional surface within the drum near the end of the latter.

A further object relates to the provision of a novel and improved means for centering the clutch and brake shoes within the ends of the drum, when the shoe is in relaxed or contracted position.

Still another object relates to the provision of a single master control shaft connected with the clutch and brake actuating mechanism for actuating the clutch mechanism when the master control shaft is rocked in one direction from a neutral position, and for actuating the brake mechanism when the master control shaft is rocked in the opposite direction from the neutral position.

Still another object relates to the provision of a spring connected with the master control shaft, whereby the latter is urged toward a position in which the brake mechanism is applied, but can be rocked by means of a foot actuated pedal from the braking position, through the neutral position to the clutch actuating position.

Still another object relates to the provision of a novel and improved booster mechanism for actuating the clutch mechanism. More specifically, an object of my invention has to do with the provision of control connections between the booster clutch drum and the shoe expanding mechanism, which insures that the engagement pressure between the clutch shoe and its drum is substantially constant, regardless of the amount of pressure applied by the operator against the pedal.

A still further object relates to the provision of means for adjusting the pressure of the clutch shoe against the drum, and to compensate for wear between the frictional surfaces.

These and other objects and advantages of my invention will be apparent to those skilled in the art after a consideration of the following description, in which reference is had to the drawings appended hereto, in which Figure 1 is a side elevational view of a clutch and brake assembly embodying the principles of my invention;

Figure 2 is an elevational view taken in section along a line 2—2 in Figure 1;

Figure 1:
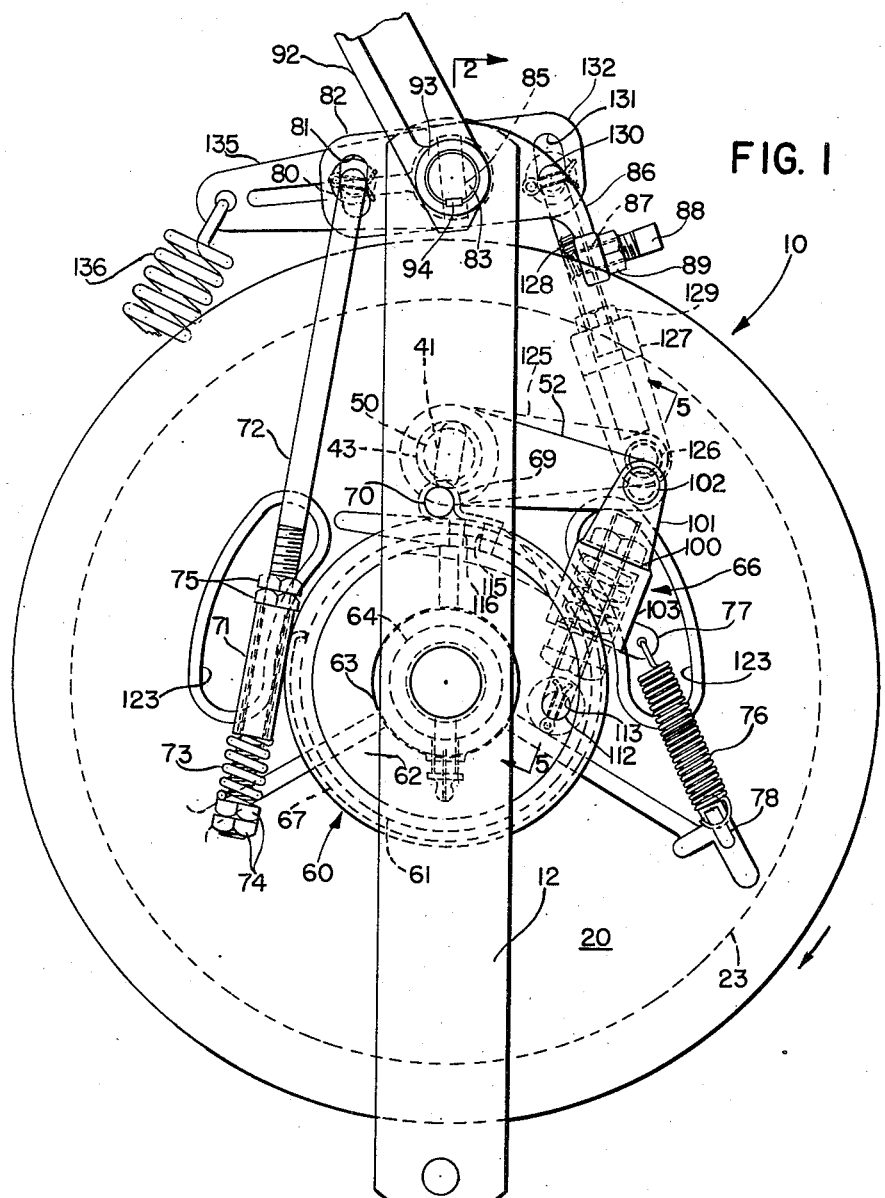

Referring now to the drawings, the clutch and brake assembly is indicated in its entirety by reference numeral 10 and comprises a central, relatively stationary supporting shaft 11, secured rigidly to a pair of side frame members 12, 13, one end of the shaft 11 being welded to one of the members 12, while the other end of the shaft 11 extends through a hub or sleeve 14, which is rigidly welded to the opposite frame member 13. The shaft 11 is secured rigidly to the hub 14 by means of a pin 15, which is inserted through aligned apertures in the hub 14 and shaft 11, respectively.

The power transmitting mechanism includes a driving member 20 and a driven member 21, both of which are rotatably mounted on the stationary shaft 11, by means providing for independent rotation about the axis of the shaft 11. The driving member 20 comprises a disk-like wheel having a hub 22 journaled on the shaft 11 and a peripherally extending V-shaped groove 23 adapted to receive a conventional V belt 24, through which power is transmitted to the driving member 20.

The driven member 21 comprises a drum, the two ends 25, 26 of which are open, mounted on a centrally disposed radially extending web 27 carried on a hub 28, which is journaled on the stationary shaft 11. The web 27 is provided with a plurality of openings 29 to provide for ventilation of the mechanism and also to decrease the weight of the driven member 21. The drum 21 is provided with a pair of interior cylindrical frictional surfaces 30, 31 disposed adjacent the two open ends 25, 26, respectively, and on opposite sides of the central supporting web 27. The surfaces 30, 31 are defined by a pair of annular inserts 32, 33, respectively. These inserts can be replaced when they are worn out.

Figure 3:
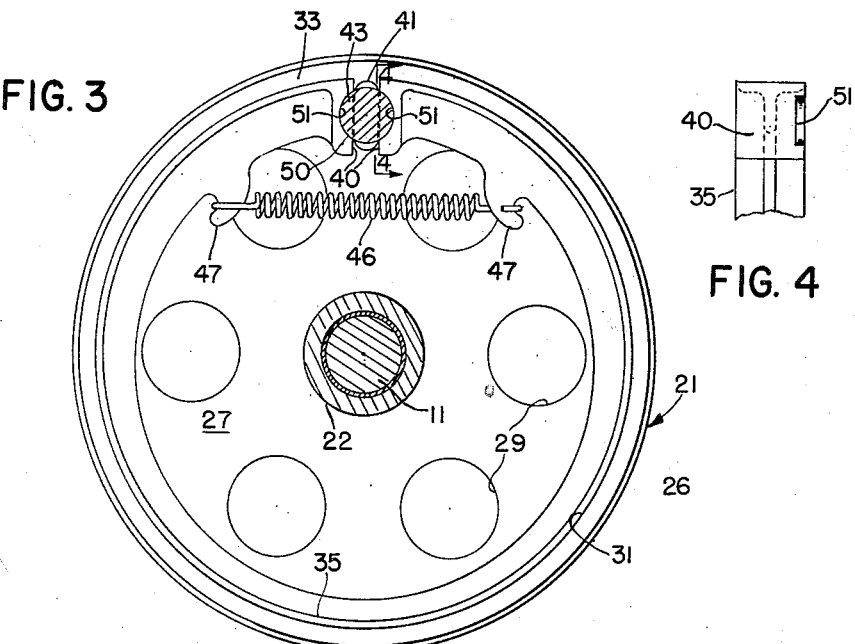
Figure 3 is a sectional elevational view taken along a line 3—3 in Figure 2, showing the details of the clutch drum and shoe.
Figure 4:
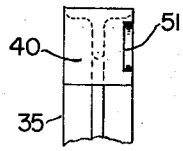
Figure 4 is a fragmentary sectional elevational view taken along a line 4—4 in Figure 3 and showing one of the ends of the clutch shoe.

A pair of annular expansible shoes 34, 35 are disposed within the cylindrical frictional surfaces 30, 31, respectively, and are adapted to be expanded into frictional gripping relation with the internal surfaces 30, 31 of the drum 21. Each of the shoes 34, 35 is provided with a pair of circumferentially spaced end abutments 40, between which is inserted a flattened cam 41 having rounded edges. The cam shaft for the shoe 34 is numbered 42 and that for the shoe 35 is numbered 43 (Fig. 2). The two cam shafts 42, 43 extend axially out of the end of the drum 21 and are journaled for rocking movement in a pair of journal bearings 44, 45, respectively. As best indicated in Figure 3, rocking the cam shaft 43 in either direction causes the flat cam 41 to spread apart the spaced abutments 40, thereby expanding the shoe 35 into frictional engagement with the interior surface 31. Each of the shoes 34, 35 is provided with a helical tension spring 46, connected with a pair of hooks or lugs 47 formed integrally with the shoe 35 on opposite sides of the pair of abutments 40. The spring 46 tends to pull the abutments 40 together to contract the shoe 35 as soon as pressure is relieved from the cam shaft 43. Each of the cam shafts 42, 43 is provided with a cylindrical neck 50 of reduced diameter, which is gripped between the abutting ends 40 of each of the shoes. Each of the abutments 40 is recessed, as indicated at 51, to fit the neck portion 50 of the cam shaft associated therewith, and thus to center the shoe within the associated cylindrical frictional surfaces 30, 31.

One of the bearings 45, in which the cam shaft 43 is journaled, is mounted on the driving member 20, preferably cast integrally therewith. The cam shaft 43 extends through the bearing 45 and carries on its outer end an actuating arm 52, preferably welded thereto. A snap ring 53 engages a peripheral groove 54 in the cam shaft 43 on the inner side of the driving wheel 20, to prevent the cam shaft 43 from moving axially through the bearing 45 out of the end of the drum 21. Thus, it is now evident that the cam shaft 43 is rotated during operation in an orbit about the shaft 11 and drives the shoe 35 through the cam 41 and abutments 40, which are secured in engagement with the cam 41 by the spring 46. Thus, normally the shoe rotates within and with respect to the frictional surface 31 without exerting any pressure thereon. However, by rocking the cam shaft 43, the cam 41 can be turned to force apart the two abutments 40, causing the shoe to expand within the frictional surface 31 and causing the driven member to rotate with the driving wheel 20 about the shaft 11.

The cam shaft 43 is rocked within its bearing 45 during the rotation of the driving wheel 20, by means of a booster clutch drum 60, provided with a cylindrical rim surface 61 carried on a radial web 62 mounted on a hub 63, which is journaled on an axially extending sleeve 64, which is preferably formed integrally with the hub 22 of the driving member 20 and journaled on the central shaft 11. The booster drum 60 is connected with the cam shaft actuating arm 52 by means of a resilient connecting device indicated in its entirety by reference numeral 66, which will be described later in greater detail. Hence, although the drum is mounted for rotation with respect to the driving member 20 (on the hub or sleeve 64 of the latter), the drum is in fact driven by and rotates normally with the driving member, inasmuch as the resilient device 66 is connected at one end to the drum 60 and at its other end to the arm 52, which is carried by the rockshaft 43 which is in turn carried by the driving member 20. However, the angled relationship of the arm 52 and device 66 is such that any variation in the relative rotative speeds of the member 20 and drum 60, will effect relative angular or rocking movement between the two, particularly since the resilient device 66 is connected to the booster drum at a point spaced radially outwardly from its axis of rotation, with the result that such angular rocking movement of the booster drum 60 relative to the driving wheel 20 will cause a force to be transmitted through the connection 66 to the actuating arm 52 to rock the cam shaft 43.

This relative rocking or angular shifting movement between the booster drum and drive wheel 20 is accomplished during rotation of the drive wheel 20 by stopping or retarding the drum 60 by means of a brake band 67 having a lining 68 wrapped around the surface 61 of the booster drum 60. The brake band 67 is provided with a tubular connector 69 at one end thereof, which engages a pin 70, secured to the frame member 12 and extending inwardly therefrom. The opposite end of the band 67 is attached to a sleeve 71, disposed tangentially relative thereto, and through which sleeve extends a threaded rod 72. A helical compression spring 73 encircles the lower end of the rod 72, which is provided with a pair of lock nuts 74 at the outer end of the spring 73. Another pair of lock nuts 75 are provided on the rod 72 above the sleeve 71. An upward movement of the rod 72 acts through the compression spring 73 to shift the sleeve 71 upwardly, and thus to wrap the brake band 67 tightly around the drum surface 61, thereby braking the drum 60 and causing it to shift angularly relative to the driving wheel 20. Hence, it is evident that with the driving wheel 20 rotating in a clockwise direction as indicated by the arrow in Figure 1, an application of the brake band 67 on the drum 60 will retard the clockwise rotation of the latter sufficiently to cause a relative angular displacement of the drum 60 in a counter-clockwise direction, thereby exerting an upward force through the resilient connection 66 to shift the actuating arm 52 upwardly, as viewed in Figure 1. This causes the rockshaft 43 and cam 41 to rock in a counterclockwise direction, thereby spreading the abutments 40 and engaging the clutch shoe 35 with the clutch drum 21, which thereupon rotates in a clockwise direction along with the driving member 20. As soon as the upward force against the rod 72 is released, the frictional braking surface of the brake band 67 against the drum 60 is released, permitting the spring 46 to gather the abutments 40 together to contract the clutch shoe 35 and disconnect the latter from the driven member 21. The action of the spring 46 is aided by means of a tension spring 76 connected to a lug 77 on the connecting member 66 and anchored to a lug 78 fixed to the side of the driving wheel 20. The tensional force of the spring 76 tends to pull the arm 52 downwardly, as viewed in Figure 1, and tends to shift the booster drum 60 angularly in a clockwise direction relative to the driving member 20.

Heretofore, booster drums have been connected with their associated clutch element by means of non-resilient linkage, with the result that a strong application of force to a rod comparable to the rod 72 causes the brake band to grab on the braking surface of the booster drum, and thus causing excessive forces to be transmitted to the clutch mechanism, frequently causing damage to the linkage and clutch mechanism. Obviously, it requires a comparatively light pressure against the brake band 67 to develop enough friction between the latter and the drum 60 to cause the latter to shift angularly relative to the driving wheel 20. I will now describe the operating mechanism by means of which the pressure against the brake band 67 is limited, regardless of how much pressure is applied by the operator, and also the means whereby the force transmitted from the booster clutch drum to the cam shaft 43 is also limited to a predetermined amount. The operating rod 72 has an upper end portion 80 which is turned at right angles through a slot 81 in an operating arm 82, which extends radially from a manually actuated control shaft 83. The arm 82 is formed with a hub 84 secured rigidly to the shaft 83 by a pin 85. The hub 84 is provided with an oppositely extending stop arm 86, which curves laterally across the edge of the frame member 12 and is provided with a threaded aperture 87, within which is mounted a set screw 88. The end of the set screw 88 engages the edge of the frame member 12 when the rockshaft 83 is rocked in a clockwise direction to pull the rod 72 upwardly, and the set screw 88 can be adjusted to permit any desired extent of rocking movement of the rockshaft 83. This adjustment can be made in such a manner that a predetermined amount of stress is applied to the compression spring 73, with the end of the set screw 88 in engagement with the edge of the frame member 12, so that regardless of the amount of pressure applied by the operator to rock the rockshaft 83, a predetermined amount of pressure is exerted by the compression spring 73 against the brake band 67. A lock nut 89 secures the set screw 88 in adjusted position. Adjustment of the set screw 88 can be made from time to time to compensate for wear in the lining 68 of the brake band 67. The rockshaft 83 is journaled in a pair of sleeve bearings 90, 91 which are supported within suitable apertures in the upper ends of the frame members 12, 13, respectively. A manually controlled operating lever 92, preferably a foot pedal, is mounted on a hub 93 which is rigidly fixed by a key 94 to the extended end of the rockshaft 83.

Figure 5:
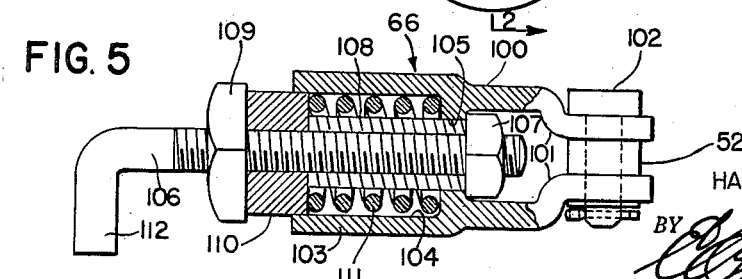
Figure 5 is an enlarged sectional view taken along a line 5—5 in Figure 1, showing the details of the resilient connection through which power is transmitted to actuate the clutch mechanism.

As best shown in Figure 5, the resilient connecting device 66 comprises a clevis 100 having a pair of arms 101 pivotally connected to the end of the cam shaft actuating arm 52 by means of a pin 102. The arms 101 are connected to the end of a tubular shank 103 having an axially extending cylindrical spring chamber 104, the inner end of which terminates at an aperture 105 of reduced diameter. A threaded rod 106 extends axially through the chamber 104 and the aperture 105 and is provided with a nut 107 threaded on the end thereof, on the opposite side of the aperture 105 from the chamber 104. A sleeve 108 is carried on the threaded rod 106 and slides within the aperture 105. A nut 109 engages the threaded rod 106 at the opposite end of the sleeve 108 and is provided with a cylindrical skirt portion 110 which is slidable within the cylindrical chamber 104. The two nuts 107, 109 are tightened together against opposite ends of the sleeve 108 so that the rod 106, the sleeve 108, and the nuts 107, 109 form a unitary structure which slides axially through the aperture 105. A helical compression spring 111 bears against the inner end of the skirt 110 and reacts against the inner end of the cylindrical chamber 104 adjacent the aperture 105. The outer end portion 112 of the rod 106 is turned at right angles and is inserted through a hole 113 in the web 62 of the booster clutch drum 60.

It is now evident that the amount of initial stress in the compression spring 111 is determined by the length of the sleeve 108, but the length of the resilient connection 66 between the end 112 of the rod 106 and the pivot pin 102 can be adjusted by adjusting both nuts 107, 109 axially along the threaded rod 106.

The extent of angular movement of the booster drum 60 relative to the drive wheel 20 is limited by a pair of stop lugs 115, 116, formed integrally with the booster drum 60 and the driving member 20, respectively. Normally, the stop lugs 115, 116 are separated, as indicated in Figure 1, but when the brake band 67 is tightened on the drum 60, the latter is retarded while the member 20 moves with respect thereto angularly about the axis of rotation until the stop lugs 115, 116 are moved into interengaging relation with each other. During this amount of relative angular movement, the threaded rod 106 is forced inwardly of the cylindrical recess 104 to apply pressure to the compression spring 111 to force the actuating arm 52 upwardly, as viewed in Figure 1. The amount of angular displacement of the booster drum 60 can be adjusted by adjusting the two nuts 107, 109 and the sleeve 108 therebetween along the threaded rod 106. Hence, in any position of adjustment of the threaded rod 106 relative to the clevis 100, the amount of pressure exerted by the spring 111 against the arm 52 is substantially constant. This amount of pressure through the arm 52 to the cam 41 and thus to the clutch shoe 35 gradually decreases as the shoe 35 and insert 31 wear, but can be restored to the predetermined value by adjusting the nuts 107, 109 relative to the rod 106. This adjustment can be made from time to time until either the shoe 35 or the insert 33 is worn out and requires replacing.

It is now evident that regardless of the amount of pressure that the operator exerts against the foot pedal 92, the pressure of the shoe 35 expanding within the cylindrical friction surface 31 is substantially constant.

The hub 28 of the driven member 21 has a sleeve extension 117, preferably formed integrally therewith, which extends axially along the shaft 11 and is journaled thereon. A sprocket 118 having a hub 119 is secured to the end of the sleeve 117 by means of a suitable key 120. The sprocket 118 provides the means by which power is taken from the driven member 21. A stationary closure plate or disk 121 is disposed at the open end 25 of the driven member 21 and is carried on a hub 122, which is journaled on the sleeve 117 between the sprocket 118 and the hub 28. Thus, foreign objects are prevented from entering the ends 25, 26 of the driven member 21 by the closure plate 121 and the driving wheel 20. However, cooling air is permitted to flow through apertures 123 in the driving member 20, through the apertures 29 in the web 27 of the driven member 21, and through the crack between the closure plate 121 and the end 25 of the member 21.

The bearing 44 which supports the cam shaft 42 is formed integrally with the closure plate 121. The outer end of the cam shaft 42 carries an actuating arm 125, preferably welded thereto, and the cam shaft 42 is secured against axial movement relative to its bearing 44 by means of the snap ring 53 and groove 54. An upwardly extending arm 124 is formed integrally with the closure plate 121 and is provided at its upper end with a journal bearing 138, in which the rockshaft 83 is journaled. This arm prevents rotation of the closure plate 121 about the shaft 11 and holds the cam shaft 42 and shoe 34 relatively stationary at all times. Thus, by rocking the cam shaft 42 to expand the brake shoe 34 into engagement with the frictional surface 30, the driven member 21 can be quickly brought to rest after the clutch shoe 35 has been disengaged from clutching relation within the frictional surface 31. The outer end of the actuating arm 125 is pivotally connected by means of a pin 126 (Figure 1) to a clevis 127 which is threaded on a threaded rod 128 and secured in axially adjusted position by a lock nut 129. The upper end of the threaded rod 128 is provided with an end portion 130 bent at right angles therto and inserted into a slot 131 in an arm 132 which is formed integrally with a hub 133 rigidly fixed to the rockshaft 83 by a pin 134. The hub 133 is also provided with an oppositely extending arm 135, to which is connected a strong spring 136, the spring being anchored at its other end to a pin 137 (see Figure 6).

It is now clear that the rockshaft 83 is a master control shaft, through which both the clutch and brake mechanisms can be controlled by the single foot pedal 92. The drawings show the parts in their normal positions in which the spring 136, acting through the arm 135 pulls upwardly on the threaded rod 128, the clevis 127, and the actuating arm 125, to rock the brake control cam shaft 42, thereby spreading or expanding the brake shoe 34 against the braking surface 30 to hold the driven member 21 stationary, while the driving member 20 is driven idly by the belt 24 at a substantially constant speed. When the operator moves the foot pedal 92 in a clockwise direction, as viewed in Figure 1, against the tension of the spring 136, the upward force against the brake arm 125 is first relieved, allowing the spring 46 within the brake shoe 34 to contract the latter, thereby freeing the driven drum 21 for rotation in either direction. Further pressure on the foot pedal 92 causes the bottom of the slot 81 in the arm 82 to engage the upper end 80 of the clutch actuating rod 72 to tighten the brake band 67 on the booster drum 60. For the reasons explained herein before, the operator can step down on the foot pedal 92 with any amount of pressure, and the clutch shoe 35 will be expanded within the clutching surface 31, causing the power to be transmitted from the drive belt 24 to the sprocket 118.

When the operator lifts his foot from the pedal 92, causing the latter together with the master control shaft 83 to be rocked in a counterclockwise direction by the tension of the spring 136, the clutch shoe 35 is first released, and further movement of the foot pedal 92 causes the brake shoe 34 to be expanded to stop the rotary movement of the driven member 21. The lost motion between the bent ends 80, 130 of the threaded rods 72, 128 in the slots 81, 131 insures that the clutch and brake mechanisms are applied independently within different portions of the range of rocking movement of the master control shaft 83.

The brake mechanism can be adjusted for wear by loosening the lock nut 129 and turning the threaded rod 128 into or out of the clevis 127. By shortening the rod 128 and clevis 127 the brake shoe can be taken up for wear until the shoe 34 or the insert 32 is worn out and replaced.

Figure 6:
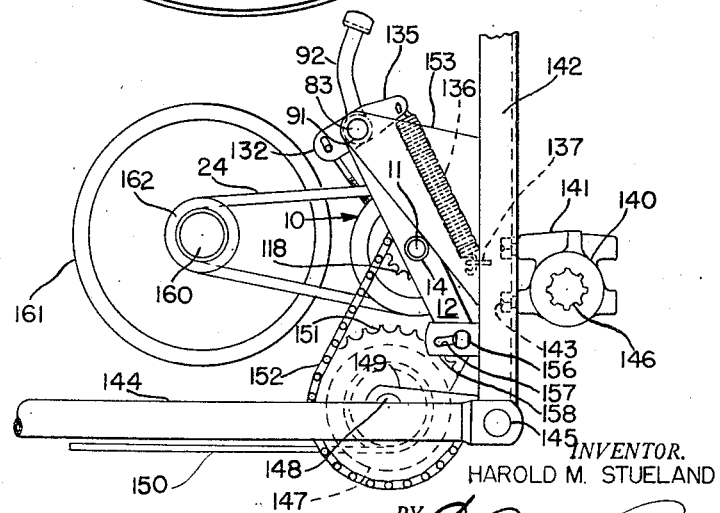
Figure 6 is a fragmentary elevational view, drawn to a smaller scale, showing the clutch and brake assembly mounted on the rear axle housing of a tractor, for use with a tractor mounted loader.

Figure 6 shows a typical installation of the clutch and brake mechanism 10 on a tractor axle housing 140 of the type provided with bosses 141 for securing the implement to the axle housing 140. The implement illustrated in Figure 6 is a loader of the type mounted across the front of a tractor and includes a vertically disposed mast 142 secured to the boss 141 by bolts 143. A bucket supporting push arm 144 is pivotally connected at 145 to the lower end of the mast 142 beneath the tractor axle 146 and extends forwardly therefrom, as described in detail in my co-pending application, Serial No. 652,504, filed March 7, 1946, now Patent No. 2,489,469. A winding drum 147 is rotatably disposed on a shaft 148 which is supported in suitable lugs 149 secured to the mast 142 near the bottom thereof. A lifting cable 150 is wound on the drum 147 and extends forwardly along the arm 144 and is used for raising and lowering the bucket in a manner described in the co-pending application. The winding drum 147 is provided with a drive socket 151, which is connected to receive power from the sprocket 118 by means of a drive chain 152.

The assembly 10 is supported between a pair of laterally spaced supporting plates 153, which are rigidly secured to the mast 142, the plates 153 having aligned apertures 154, within which the bearing sleeves 90, 91 are journaled. The lower ends of the frame members 12, 13 are provided with transversely aligned apertures 155 which receive a pair of bolts 156 adapted to be inserted through arcuate slots 157 in a pair of plates 158, which are rigidly fixed to the mast 142. The slot 157 is curved about the axis of the master control shaft 83 as a center to provide for shifting the frame members 12, 13 about the last named axis to adjust the tightness of the belt 24, after which the bolts 156 can be tightened to secure the lower end of the frame members 12, 13.

The crank shaft of the tractor is indicated at 160, on which is mounted a flywheel 161. The drive belt 24 is trained over a V-belt pulley 162, which is rigidly secured to the end of the crank shaft 160.

During operation, the crank shaft 160 turns at a substantially constant rate of speed, driving the driving wheel 20. Normally the brake is held in engaged position by the spring 136, holding the bucket supporting arms 144 at any desired elevation. The operator can lower the bucket by pressing the pedal 92 forwardly to the neutral position, in which both the brake and clutch shoes 34, 35 are disengaged, allowing the weight of the bucket and arms 144 to unwind the cable 150 from the drum 147. By pressing the foot pedal 92 forwardly to the position in which the set screw 88 engages the frame member 12, the clutch is engaged, causing the driven member 21 to turn the sprocket 118 in a direction to wind the cable 150 on the winding drum 147.

I do not intend my invention to be limited to the exact details shown and described herein, except as limited by the claims which follow.

I claim:

1. In a clutch assembly, a driving member and a driven member supported for rotation about a common axis, said driven member having an internal cylindrical surface coaxial with said members, an expansible shoe disposed within said cylindrical surface, a rockable control shaft journaled on said driving member and having a camming element for expanding said shoe responsive to rocking movement of said shaft, a control drum mounted coaxially of said driving member and normally rotatable with the latter but shiftable angularly relative thereto, resilient means connecting said control shaft with said control drum providing for rocking said shaft by angular movement of said drum relative to said driving member, braking means engageable with said drum for effecting said relative angular movement, and stop means arranged and constructed to limit the extent of said relative angular movement.

2. In a clutch assembly, a driving member and a driven member supported for rotation about a common axis, said driven member having an internal cylindrical surface coaxial with said members, an expansible shoe disposed within said cylindrical surface and having a pair of peripherally spaced ends, a cam shaft rockably mounted on said driving member and extending between the ends of said shoe, a cam element on said cam shaft between said spaced ends of the shoe for expanding the latter into engagement with said surface responsive to rocking movement of said cam shaft, said shoe ends having recesses for receiving a cylindrical portion of said cam shaft therebetween to center said shoe in relaxed position, a control drum mounted coaxially of said driving member and normally rotatable with the latter but shiftable angularly relative thereto, resilient means connecting said control shaft with said control drum providing for rocking said shaft by angular movement of said drum relative to said driving member, braking means engageable with said drum for effecting said relative angular movement, and stop means arranged and constructed to limit the extent of said relative angular movement.

3. A clutch and brake assembly comprising a support, a pair of driving and driven members journaled on said support, clutch mechanism for connecting said driving and driven members including interengageable frictional surfaces on said members and control means for engaging said surfaces including a clutch actuating element and a booster drum coupled thereto, said booster drum being rotatably mounted adjacent said driving member and shiftable angularly relative thereto about the axis of rotation to engage said clutch surfaces, a master control shaft spaced from said driving member and mounted rockably on said support, braking means engageable with said booster drum and connected with said master shaft to shift said booster drum relative to said driving member responsive to rocking movement of said master shaft in one direction from a neutral position, and braking means for said driven member comprising a pair of interengageable frictional braking surfaces and an actuating element for engaging the latter, and means connecting said actuating element to said master control shaft for engaging said surfaces responsive to a rocking movement of said master shaft in the opposite direction from said neutral position.

4. A clutch and brake assembly comprising a support, a pair of driving and driven members journaled on said support, clutch mechanism for connecting said driving and driven members including interengageable frictional surfaces on said members and control means for engaging said surfaces including a clutch actuating element and a booster drum coupled thereto, said booster drum being rotatably mounted adjacent said driving member and shiftable angularly relative thereto about the axis of rotation to engage said clutch surfaces, a master control shaft spaced from said driving member and mounted rockably on said support, braking means engageable with said booster drum and connected with said master shaft to shift said booster drum relative to said driving member responsive to rocking movement of said master shaft in one direction from a neutral position, and braking means for said driven member comprising a pair of interengageable frictional braking surfaces and an actuating element for engaging the latter, means connecting said actuating element to said master control shaft for engaging said surfaces responsive to a rocking movement of said master shaft in the opposite direction from said neutral position, a spring connected to said master control shaft to urge the latter toward a position in which said braking surfaces are engaged, and a foot operated lever attached to said master shaft and shiftable against the pressure of said spring from braking position, through said neutral position, to a driving position in which said clutch surfaces are engaged.

5. In mechanism of the class described, a driven member comprising a drum having a central supporting web, and a pair of open ends, a pair of internal cylindrical frictional surfaces within said drum adjacent said open ends, respectively, a pair of expansible annular shoes disposed within said drum ends, respectively, each shoe having a pair of peripherally spaced abutments, a pair of control shafts extending into said drum ends, respectively, and having cam portions engageable with the associated abutments for expanding said shoes by rocking movement of said shafts, respectively, a pair of supports for said shafts disposed adjacent the ends of said drum, respectively, characterized in that one of said control shaft supports comprise a rotatable driving member and said control means includes a booster drum disposed coaxial with said driving member adjacent the latter and shiftable angularly relative thereto about the axis of rotation, means connecting said booster drum with the associated control shaft providing for actuation of the latter by angular shifting movement of said drum, and braking means engageable with said booster drum.

6. In mechanism of the class described, a driven member comprising a drum having a central supporting web, and a pair of open ends, a pair of internal cylindrical frictional surfaces within said drum adjacent said open ends, respectively, a pair of expansible annular shoes disposed within said drum ends, respectively, each shoe having a pair of peripherally spaced abutments, a pair of control shafts extending into said drum ends, respectively, and having cam portions engageable with the associated abutments for expanding said shoes by rocking movement of said shafts, respectively, a pair of supports for said shafts disposed adjacent the ends of said drum, respectively, characterized in that one of said control shaft supports comprises a rotatable driving member and said control means includes a booster drum disposed coaxial with said driving member adjacent the latter and shiftable angularly relative thereto about the axis of rotation, means connecting said booster drum with the associated control shaft providing for actuation of the latter by angular shifting movement of said drum, and braking means engageable with said booster drum, the other of said control shaft supports being relatively stationary, said control means including a brake control lever connected to the control shaft mounted on the last named support.

7. In mechanism of the class described, a driven member comprising a drum having a central supporting web, and a pair of open ends, a pair of internal cylindrical frictional surfaces within said drum adjacent said open ends, respectively, a pair of expansible annular shoes disposed within said drum ends, respectively, each shoe having a pair of peripherally spaced abutments, a pair of control shafts extending into said drum ends, respectively, and having cam portions engageable with the associated abutments for expanding said shoes by rocking movement of said shafts, respectively, a pair of supports for said shafts disposed adjacent the ends of said drum, respectively, characterized in that one of said control shaft supports comprises a rotatable driving member and said control means includes a booster drum disposed coaxial with said driving member adjacent the latter and shiftable angularly relative thereto about the axis of rotation, means connecting said booster drum with the associated control shaft providing for actuation of the latter by angular shifting movement of said drum, braking means engageable with said booster drum, a rockably mounted master control shaft spaced from said booster drum, a connection between said master control shaft and said braking means for braking said booster drum when said master control shaft is rocked in one direction from a neutral position, the other of said control shaft supports being relatively stationary, and a connection between said master control shaft and the control shaft mounted on the last named support for actuating the latter control shaft to brake said driven member when said master control shaft is rocked in the opposite direction from said neutral position.

8. In combination, a drum having an annular internal friction surface; an expansible shoe, having an external friction surface engageable with the drum surface, carried within the drum and constructed as a substantially circular ring-like member interrupted in its circular extent at but one portion thereof to provide a pair of peripherally spaced apart ends respectively having opposed, spaced apart flat faces generally transverse to the shoe periphery; an operating member between the shoe end faces; means mounting said operating member for movement with respect to the shoe and drum between an inactive position and an active position; means normally maintaining the operating member in inactive position; means on the operating member providing a pair of opposite, flat cam faces respectively in face-to-face relationship with the shoe end faces when the operating member is in inactive position and operable to spread the shoe ends when said operating member is moved to active position; spring means connected across the shoe ends to normally hold the shoe end faces in face-to-face engagement with the operating member faces to effect a clamping action of the shoe on the operating member whereby said operating member serves, in its inactive position, as the sole means for supporting and centering the shoe in the drum.

HAROLD M. STUELAND.

REFERENCES CITED

The following references are of record in the file of this patent:

UNITED STATES PATENTS

| Number | Name | Date |
| --- | --- | --- |
| 794,291 | Ford-Smith et al. | July 11, 1905 |
| 821,680 | Turner | May 29, 1906 |
| 965,825 | Locke et al. | July 26, 1910 |
| 1,764,923 | Wilson | June 17, 1930 |
| 1,813,068 | Mitchell et al. | July 7, 1931 |
| 1,834,222 | Ronk | Dec. 1, 1931 |
| 2,402,400 | Hewitt et al. | June 18, 1946 |
| 2,443,042 | Kriegbaum | June 8, 1948 |